(12) United States Patent
Wakahoi et al.

(10) Patent No.: US 7,309,542 B2
(45) Date of Patent: Dec. 18, 2007

(54) MEMBRANE ELECTRODE ASSEMBLY AND FUEL CELL

(75) Inventors: Toshiya Wakahoi, Utsunomiya (JP); Narutoshi Sugita, Utsunomiya (JP); Shuhei Goto, Utsunomiya (JP); Takeo Abe, Tochigi-ken (JP); Hiroyuki Shirokawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 10/888,894

(22) Filed: Jul. 9, 2004

(65) Prior Publication Data

US 2005/0048342 A1    Mar. 3, 2005

(30) Foreign Application Priority Data

Jul. 9, 2003  (JP) ............................. 2003-272311
Dec. 22, 2003  (JP) ............................. 2003-425375

(51) Int. Cl.
*H01M 2/14* (2006.01)

(52) U.S. Cl. ....................................................... 429/38

(58) Field of Classification Search ............... 429/30, 429/40, 38
See application file for complete search history.

(56) References Cited

U.S. PATENT DOCUMENTS

| 5,998,055 | A | 12/1999 | Kurita et al. |
|---|---|---|---|
| 6,020,083 | A | 2/2000 | Breault et al. |
| 6,261,710 | B1 | 7/2001 | Marianowski |
| 6,794,079 | B2 | 9/2004 | Inagaki et al. |
| 6,998,186 | B2 * | 2/2006 | Sato et al. ............... 429/26 |
| 2002/0117780 | A1 | 8/2002 | Inoue et al. |
| 2004/0121215 | A1 * | 6/2004 | Fujii et al. ............... 429/35 |

FOREIGN PATENT DOCUMENTS

| DE | 10226962 A1 | 2/2003 |
|---|---|---|
| EP | 1220347 A2 | 7/2002 |
| EP | 1 387 424 * | 2/2004 |
| EP | 1387424 A2 | 2/2004 |
| JP | 07-183033 | 7/1995 |
| JP | 10-106594 | 4/1998 |
| JP | 2002-529890 | 9/2002 |

OTHER PUBLICATIONS

German Office Action for Application No. 1913131, dated May 23, 2007.

* cited by examiner

*Primary Examiner*—Patrick Joseph Ryan
*Assistant Examiner*—Thomas H. Parsons
(74) *Attorney, Agent, or Firm*—Lahive & Cockfield, LLP; Anthony A. Laurentano, Esq.

(57) ABSTRACT

A membrane electrode assembly includes an anode, a cathode, and a solid polymer electrolyte membrane interposed between the anode and the cathode. The membrane electrode assembly has a substantially rectangular shape as a whole. Extensions extend outwardly from four corners of the membrane electrode assembly. Each of the extensions has an inclined end to have a substantially triangle shape. The membrane electrode assembly has a substantially rectangular power generation area.

12 Claims, 10 Drawing Sheets

(Prior Art)

MEMBRANE ELECTRODE ASSEMBLY AND FUEL CELL

BACKGROUND OF THE INVENTION

1. Field of the Invention

The present invention relates to a membrane electrode assembly including a first electrode, and a second electrode, and a solid polymer electrolyte membrane interposed between the first electrode and the second electrode. Further, the present invention relates to a fuel cell including the membrane electrode assembly.

2. Description of the Related Art

For example, a solid polymer fuel cell employs a membrane electrode assembly (MEA) which includes an anode and a cathode), and an electrolyte membrane interposed between the anode and the cathode. The electrolyte membrane is a polymer ion exchange membrane (proton exchange membrane). Each of the anode and the cathode is made of electrode catalyst and porous carbon. The membrane electrode assembly and separators (bipolar plates) sandwiching the membrane electrode assembly make up a unit of a fuel cell for generating electricity. A predetermined number of the fuel cells are stacked together to form a fuel cell stack.

In the fuel cell, a fuel gas such as a gas chiefly containing hydrogen (hydrogen-containing gas) is supplied to the anode as a reactant gas. The catalyst of the anode induces a chemical reaction of the fuel gas to split the hydrogen molecule into hydrogen ions (protons) and electrons. The hydrogen ions move toward the cathode through the electrolyte membrane, and the electrons flow through an external circuit to the cathode, creating a DC electric current. A gas chiefly containing oxygen or air (oxygen-containing gas) is supplied to the cathode as a reactant gas. At the cathode, the hydrogen ions from the anode combine with the electrons and oxygen to produce water.

In the fuel cell, a fuel gas flow field (reactant gas flow field) is formed in a surface of the separator facing the anode, and an oxygen-containing gas flow field (reactant gas flow field) is formed in a surface of the separator facing the cathode. Further, a coolant flow field is formed between the separators for supplying a coolant along the surfaces of the separators. Generally, each of the fuel gas flow field, the oxygen-containing gas flow field, and the coolant flow field includes a plurality of serpentine grooves or straight grooves connecting a fluid supply passage and a fluid discharge passage extending through the separators in the stacking direction.

When the size of the fluid supply passage or the fluid discharge passage connected to the grooves is small, it is required to provide a buffer section around the fluid supply passage or the fluid discharge passage for preventing closure of the grooves by flooding of liquid flowing through the grooves.

Figure 10:
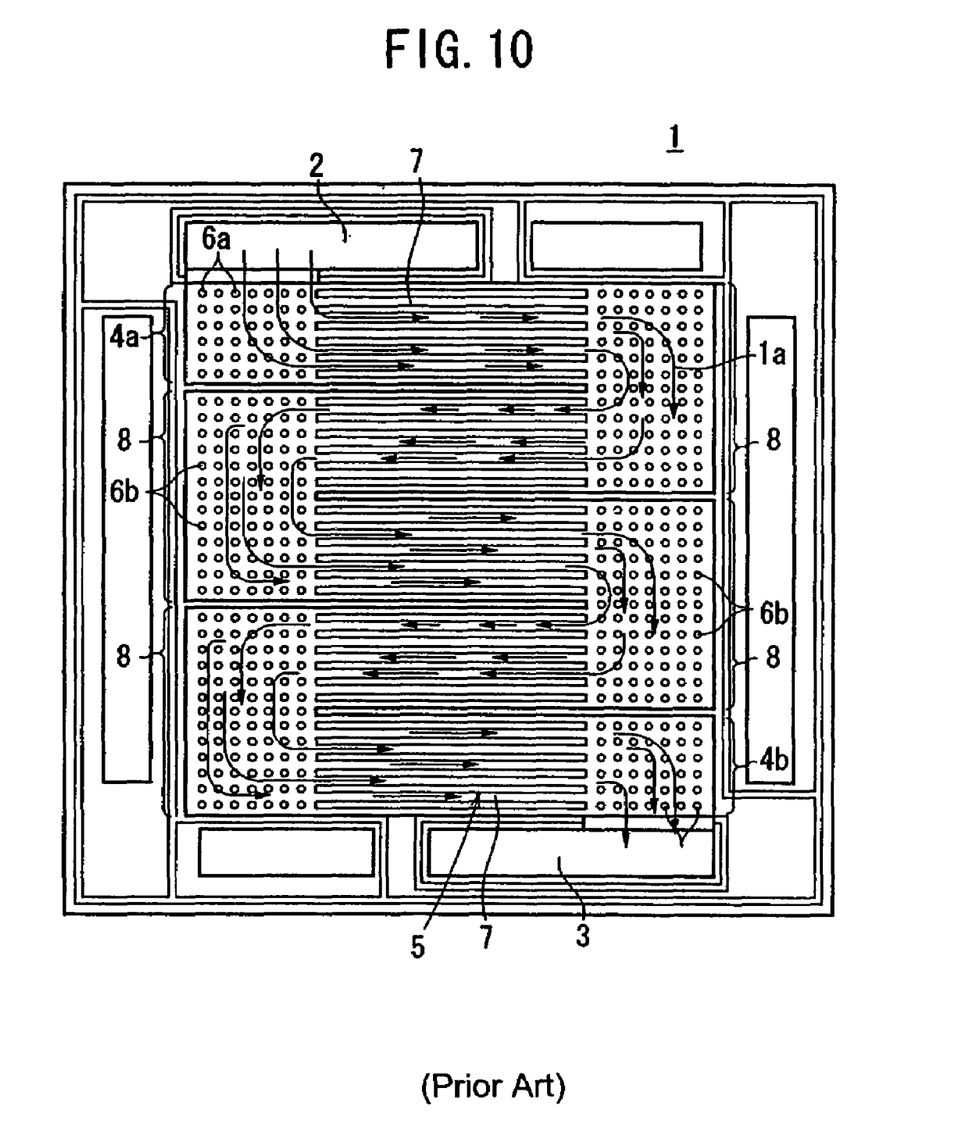
FIG. 10 is a view showing a gas flow field plate of a conventional fuel cell.

For example, a gas flow field plate of a fuel cell as disclosed in Japanese laid open patent publication No. 10-106594 is known. Referring to FIG. 10, a gas flow field plate 1 having an oxygen-containing gas passage is provided. An inlet manifold 2 for the oxygen-containing gas is provided at an upper part of the gas flow field plate 1, and an outlet manifold 3 for the oxygen-containing gas is provided at a lower part of the gas flow field plate 1.

The gas flow field plate 1 includes an inlet flow field 4a connected to the inlet manifold 2, an outlet flow field 4b connected to the outlet manifold 3, and an intermediate flow field 5 connecting the inlet flow field 4a and the outlet flow field 4b. Protrusions 6a are provided in the inlet flow field 4a and the outlet flow field 4b. Thus, the inlet flow field 4a and the outlet flow field 4b are formed in a matrix pattern. The intermediate flow field 5 has a curved pattern including a plurality of turn regions. A plurality of straight grooves 7 and matrix flow fields 8 are provided in the intermediate flow field. The matrix flow fields 8 are formed by a plurality of protrusions 6b at the turn regions.

In the gas flow field plate 1 of the fuel cell, the inlet flow field 4a and the outlet flow field 4b function as buffer sections. A large area of the electrode surface is exposed to the gas supplied to the electrode, and the gas freely moves along the electrode. In the intermediate gas flow field 5, the reactant gas flows through the plurality of straight grooves 7 uniformly at high speed.

In the gas flow field plate 1, practically, a plurality of serpentine flow passages 1a are formed between the inlet manifold 2 and the outlet manifold 3. At the turn regions of the flow passage 1a, the flow fields 8 in the matrix pattern are formed by the protrusions 6b. The inlet flow field 4a and the outlet flow field 4b are formed in the matrix pattern by the protrusions 6a.

The inlet flow field 4a, the outlet flow field 4b, and the matrix flow field 8 form buffer sections. In the buffer sections, the contact resistance increases, and the power generation performance decreases undesirably. In particular, the buffer sections take up a large surface area of the gas passage plate 1 having the flow passage 1a. Therefore, power generation may not be performed efficiently.

SUMMARY OF THE INVENTION

A general object of the present invention is to provide a membrane electrode assembly and a fuel cell which achieves the desired power generation performance with a simple structure.

In the present invention, the membrane electrode assembly has a substantially rectangular shape as a whole. At least one corner of the membrane electrode assembly has an extension which extends outwardly. Specifically, the extension protrudes toward a buffer section provided outside a power generation area of the membrane electrode assembly.

It is preferable that at least two extensions are provided at diagonal positions of the membrane electrode assembly. For example, the two extensions are formed at positions corresponding to an inlet buffer section for supplying a reactant gas to a reactant gas flow field, and an outlet buffer section for discharging the reactant gas from the reactant gas flow field after the reactant gas is consumed in power generation.

Generally, a reactant gas flow field is formed on one surface of the separator, and a coolant flow field is formed on the other surface of the separator. The reactant gas flow field is connected to the inlet buffer section and the outlet buffer section. Likewise, the coolant flow field is connected to an inlet buffer section and an outlet buffer section for the coolant. Therefore, when the separator is made of a metal plate, protrusions and recesses are formed on both surfaces of the metal plate at regions corresponding to the four buffer sections.

Further, it is preferable that the extension has an inclined end to have a substantially triangular shape.

Furthermore, it is preferable that the surface area of the first electrode is smaller than the surface area of the second electrode, and the second electrode covers the entire surface of the solid polymer electrolyte membrane. It is easy to distinguish between the back surface and the front surface of the membrane electrode assembly. Therefore, in assembling the fuel cell, it is not likely that the front surface of the membrane electrode assembly is mistakenly handled as the back surface of the membrane electrode assembly, and vice versa.

Further, it is preferable that the membrane electrode assembly has a rotationally symmetrical shape. With the structure, even if the membrane electrode assembly is rotated by 180°, the shape of the membrane electrode assembly does not change. Thus, the fuel cell can be assembled easily and efficiently.

It is preferable that the reactant gas flow field has a serpentine passage having an even number of turn regions in the surface of the separator, and the width of the extension is substantially the same as the width of the turn regions of the serpentine passage.

According to the present invention, an extension extends from at least one corner of the membrane electrode assembly. The extension seals the buffer section hermetically for preventing leakage of the reactant gas from the buffer section. Further, since only the extension is formed outside the power generation area, it is possible to supply the reactant gas to the entire surface of the substantially rectangular membrane electrode assembly. The effective power generation area of the membrane electrode assembly is increased, and thus, the power generation efficiency of the membrane electrode assembly is improved. With the simple structure, it is possible to achieve the desired power generation performance.

The reactant gas flows smoothly, and flooding of the reactant gas is prevented. The inlet buffer section and the outlet buffer section are sealed reliably. With the four extensions provided at diagonal positions of the membrane electrode assembly, it is possible to reliably seal the four buffer sections of the metal plate hermetically.

The wide area of the membrane electrode assembly can be used for power generation. Thus, the power generation can be carried out efficiently. It is possible to maintain the desired power generation performance of the membrane electrode assembly in which the surface area of the first electrode is smaller than the surface area of the second electrode. The buffer sections are not provided in the power generation area. The contact resistance does not increase, and thus, the power generation performance can be improved easily.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
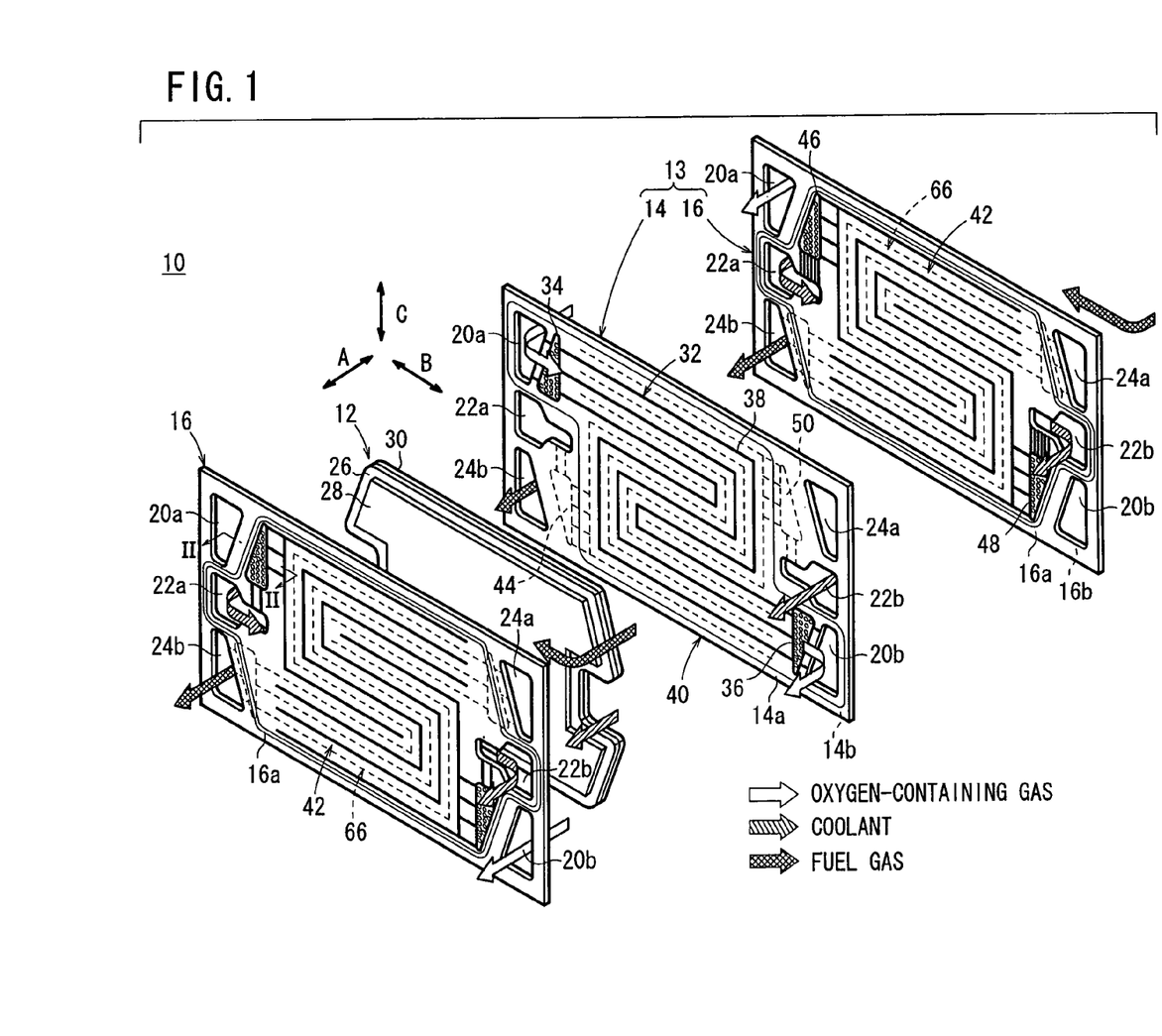
FIG. 1 is an exploded perspective view showing main components of a fuel cell according to an embodiment of the present invention.
Figure 2:
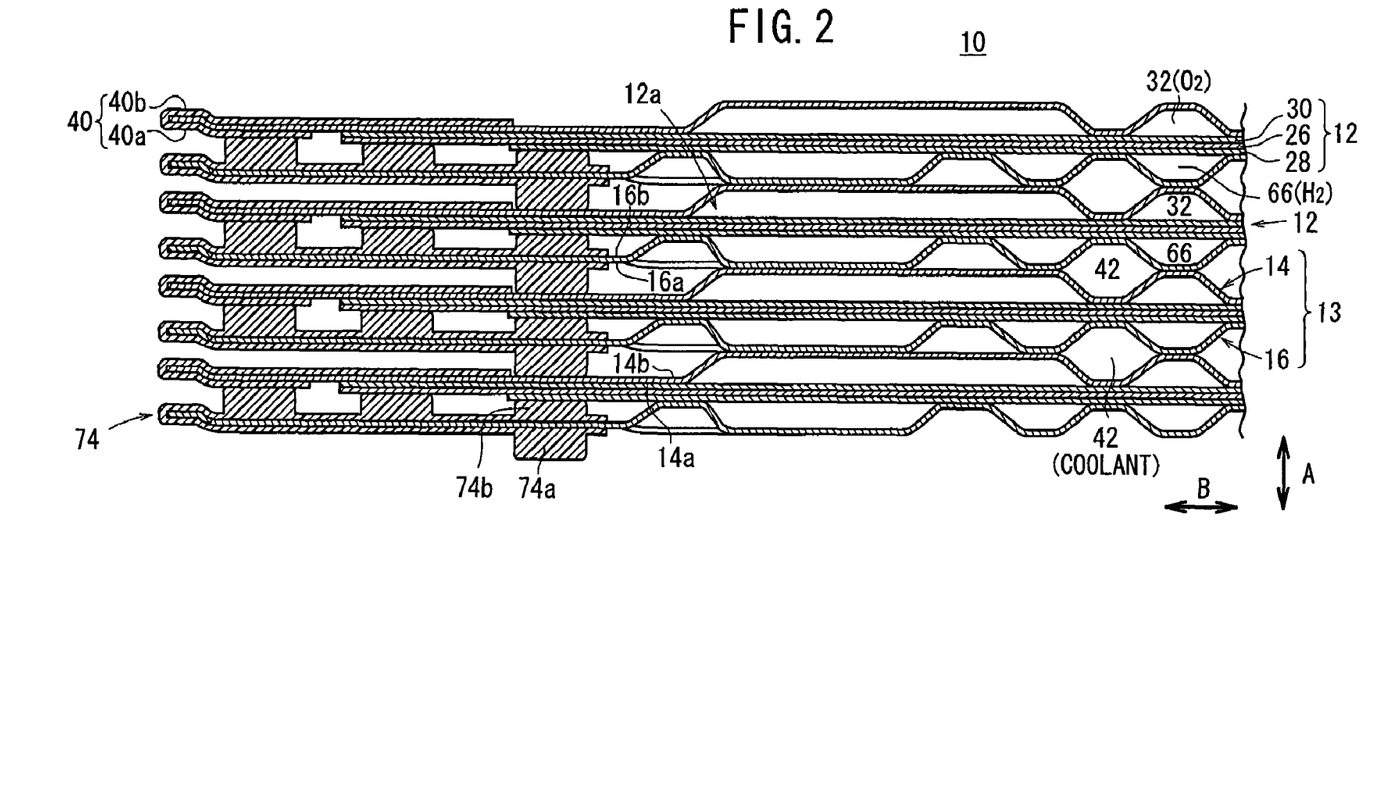
FIG. 2 is a cross sectional view taken along a line II-II shown in FIG. 1, showing a fuel cell stack formed by stacking the fuel cells.

FIG. 1 is an exploded perspective view showing main components of a fuel cell 10 according to an embodiment of the present invention. FIG. 2 is a cross sectional view taken along a line II-II shown in FIG. 1, showing a fuel cell stack formed by stacking the fuel cells 10 in a stacking direction indicated by an arrow A.

The fuel cell 10 includes a membrane electrode assembly 12 and separators 13 sandwiching the membrane electrode assembly 12. Each of the separators 13 includes a first metal plate 14 and a second metal plate 16 which are stacked together.

As shown in FIG. 1, at an end of the fuel cell 10 in a direction indicated by an arrow B, an oxygen-containing gas supply passage 20a for supplying an oxygen-containing gas (reactant gas), a coolant supply passage 22a for supplying a coolant, and a fuel gas discharge passage 24b for discharging a fuel gas (reactant gas) such as a hydrogen-containing gas are arranged vertically in a direction indicated by an arrow C. The oxygen-containing gas supply passage 20a, the coolant supply passage 22a, and the fuel gas discharge passage 24b extend through the fuel cell 10 in the stacking direction indicated by the arrow A.

At the other end of the fuel cell 10 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged in the direction indicated by the arrow C. The fuel gas supply passage 24a, the coolant discharge passage 22b, and the oxygen-containing gas discharge passage 20b extend through the fuel cell 10 in the direction indicated by the arrow A.

Figure 3:
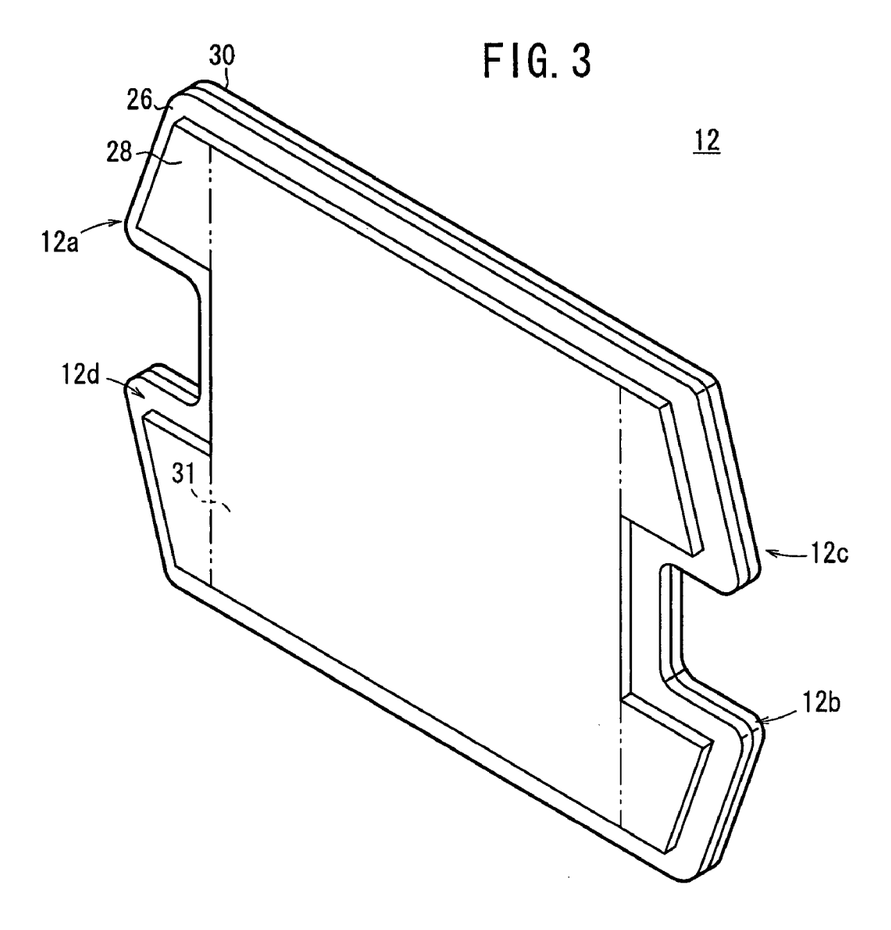
FIG. 3 is a perspective view showing a membrane electrode assembly of the fuel cell according to the embodiment of the present invention.

As shown in FIGS. 1 and 3, the membrane electrode assembly 12 comprises an anode (first electrode) 28, and a cathode (second electrode) 30, and a solid polymer electrolyte membrane 26 interposed between the anode 28 and the cathode 30. The solid polymer electrolyte membrane 26 is formed by impregnating a thin membrane of perfluorosulfonic acid with water, for example. The surface area of the anode 28 is smaller than the surface area of the cathode 30. The cathode 30 covers the entire circumference of the solid polymer electrolyte membrane 26.

Each of the anode 28 and the cathode 30 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively.

The membrane electrode assembly 12 has a rectangular shape as a whole. At least one corner of the membrane electrode assembly has an extension. In the embodiment of the present invention, four corners of the membrane electrode assembly 12 have extensions 12a to 12d, respectively. The extensions 12a to 12d extend outwardly at respective diagonal positions. Each of the extensions 12a to 12d includes an inclined end to have a substantially triangular shape corresponding to the shape of a buffer section as described later.

The shape of the membrane electrolyte assembly 12 has rotational symmetry of 180° in a plan view, i.e., the shape of the membrane electrolyte assembly 12 does not change after the membrane electrolyte assembly 12 is rotated by 180°. Specifically, each of the solid polymer electrolyte membrane 26, the anode 28, and the cathode 30 has a rotationally symmetrical shape (see FIG. 3). The membrane electrode assembly 12 has a rectangular power generation area 31, and the extensions 12a to 12d are provided outside the power generation area 31.

Figure 4:
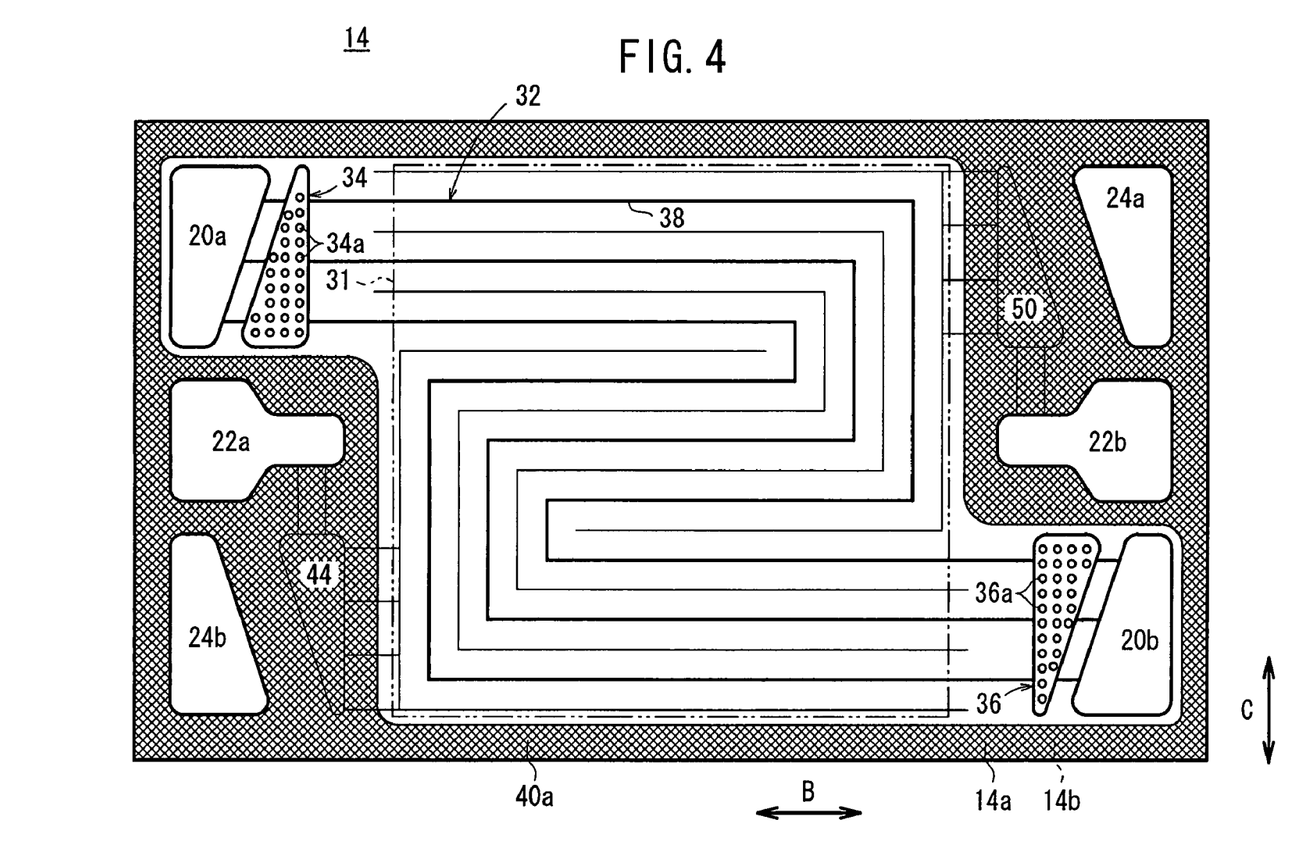
FIG. 4 is a front view showing one surface of a first metal plate of the fuel cell.

As shown in FIGS. 1 and 4, the first metal plate 14 has an oxygen-containing gas flow field (reactant gas flow field) 32 on its surface 14a facing the membrane electrode assembly 12. The oxygen-containing gas flow field 32 is connected to the oxygen-containing gas supply passage 20a at one end, and connected to the oxygen-containing gas discharge passage 20b at the other end. In the oxygen-containing gas flow field 32, a substantially right triangular (substantially triangular) inlet buffer section 34 is provided near the oxygen-containing gas supply passage 20a, and a substantially right triangular (substantially triangular) outlet buffer section 36 is provided near the oxygen-containing gas discharge passage 20b. The shape of the inlet buffer section 34 and the shape of the outlet buffer section 36 are substantially symmetrical with each other. A plurality of bosses 34a are formed in the buffer section 34, and a plurality of bosses 36a are formed in the buffer section 36.

The oxygen-containing gas flow field 32 includes a plurality of oxygen-containing gas grooves 38 extending in parallel, and connected between the inlet buffer section 34 and the outlet buffer section 36. Each of the oxygen-containing gas grooves 38 has a serpentine pattern such that the oxygen-containing gas flows through the oxygen-containing gas grooves 38 flows back and forth in the direction indicated by the arrow B, and turns in the direction indicated by the arrow C. The inlet buffer section 34 and the outlet buffer section 36 are provided outside the power generation area 31. The extensions 12a, 12b of the membrane electrode assembly 12 correspond to the shapes of the inlet buffer section 34 and the outlet buffer section 36.

The oxygen-containing gas flow field 32 has a serpentine passage having an even number of, e.g., two turn regions in the surface 14a of the first metal plate 14. The width of the extensions 12a, 12b is substantially the same as the width of the turn regions of the serpentine passage.

A planar seal 40a is provided on the surface 14a of the first metal plate 14. The planar seal 40a is provided around the oxygen-containing gas supply passage 20a, the oxygen-containing gas discharge passage 20b, and the oxygen-containing gas flow field 32 for preventing leakage of the oxygen-containing gas.

Figure 5:
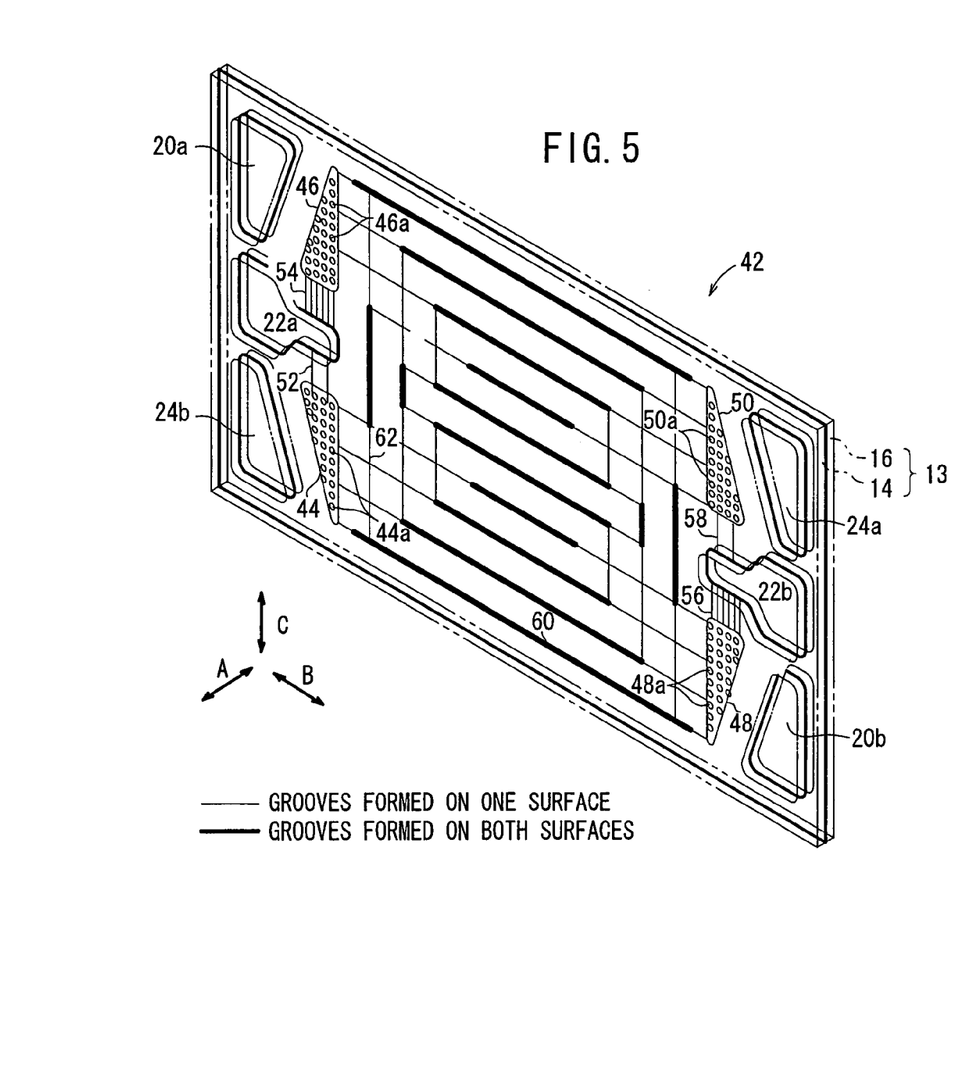
FIG. 5 is a perspective view showing a coolant flow field formed in a separator.

When the first metal plate 14 and the second metal plate 16 are stacked together, a coolant flow field 42 is formed between the surface 14b of the first metal plate 14 and the surface 16a of the second metal plate 16 which face each other. As shown in FIG. 5, in the coolant flow field 42, substantially triangular first and second inlet buffer sections 44, 46 are provided at opposite ends in the direction indicated by the arrow C, near the coolant supply passage 22a, and substantially triangular first and second outlet buffer sections 48, 50 are provided at opposite ends indicated by the arrow C, near the coolant discharge passage 22b.

The shape of the first inlet buffer section 44 and the shape of the second outlet buffer section 50 are substantially symmetrical with each other. The shape of the second inlet buffer section 46 and the shape of the first outlet buffer section 48 are substantially symmetrical with each other. A plurality of bosses 44a, 46a, 48a, and 50a are formed in the first inlet buffer section 44, the second inlet buffer section 46, the first outlet buffer section 48, and the second outlet buffer section 50, respectively.

The coolant supply passage 22a and the first inlet buffer section 44 are connected by a first inlet connection channel 52, and the coolant supply passage 22a and the first inlet buffer section 46 are connected by a second inlet connection channel 54. The coolant discharge passage 22b and the first outlet buffer section 48 are connected by a first outlet connection channel 56, and the coolant discharge passage 22b and the second outlet buffer section 50 are connected by a second outlet connection channel 58.

Figure 6:
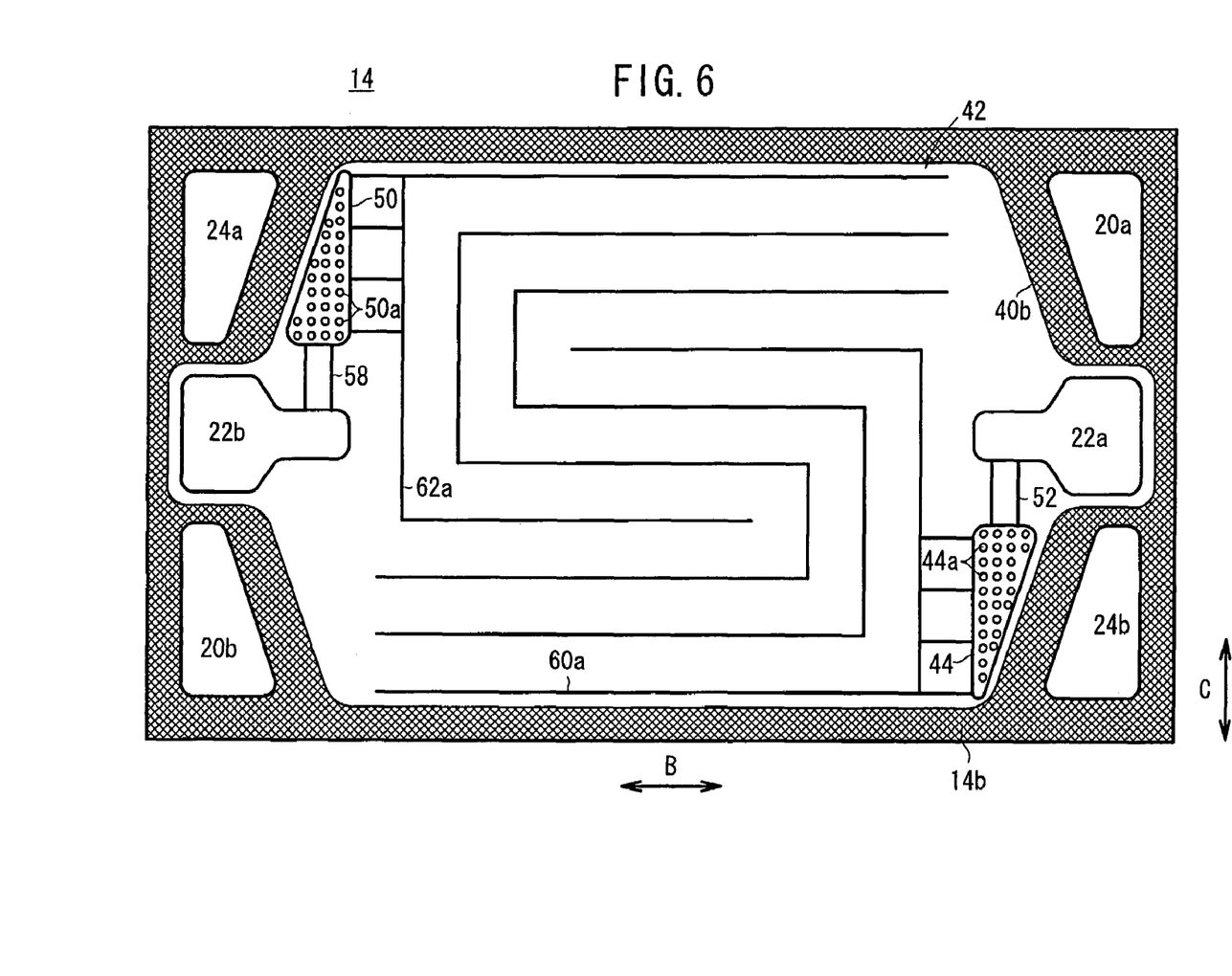
FIG. 6 is a front view showing the other surface of the first metal plate.

The coolant flow field 42 includes a plurality of straight grooves 60 extending in the direction indicated by the arrow B, and a plurality of straight grooves 62 extending in the direction indicated by the arrow C. The grooves of the coolant flow field 42 are formed partially on the first metal plate 14 and partially on the second metal plate 16. When the first metal plate 14 and the second metal plate 16 are stacked together, the coolant flow field 42 is formed between the first metal plate 14 and the second metal plate 16. As shown in FIG. 6, the coolant flow field 42 is formed on part of the surface 14b of the first metal plate 14. The coolant flow field 42 is not formed in a region where the oxygen-containing gas flow field 32 is formed on the surface 14a of the first metal plate 14.

On the surface 14b, protrusions corresponding to the grooves of the oxygen-containing gas flow field 32 on the surface 14a are formed. For the purpose of brevity, the protrusions on the surface 16b are not illustrated in FIG. 6. Likewise, on the surface 16b, protrusions corresponding to the grooves of a fuel gas flow field (reactant gas flow field) 66 on the surface 16a shown in FIG. 8 as described later are formed. The protrusions on the surface 16b are not illustrated in FIG. 7.

The first inlet buffer section 44 connected to the coolant supply passage 22a through the first inlet connection channel 52, and the second outlet buffer section 50 connected to the coolant discharge passage 22b through the second outlet connection channel 58 are formed on the surface 14b. Further, a plurality of grooves 60a as part of the straight grooves 60 extend in the direction indicated by the arrow B, and a plurality of grooves 62a as part of the straight grooves 62 extend in the direction indicated by the arrow C on the surface 14b.

A planar seal 40b is provided on the surface 14b of the first metal plate 14. The planar seal 40b is provided around the coolant supply passage 22a, the coolant discharge passage 22b, and the coolant flow field 42 for preventing leakage of the coolant. The planar seals 40a, 40b form a first seal member 40. The first seal member 40 is provided integrally on the surfaces 14a, 14b of the first metal separator 14 to cover (sandwich) the outer edge of the first metal separator 14 (see FIG. 2).

Figure 7:
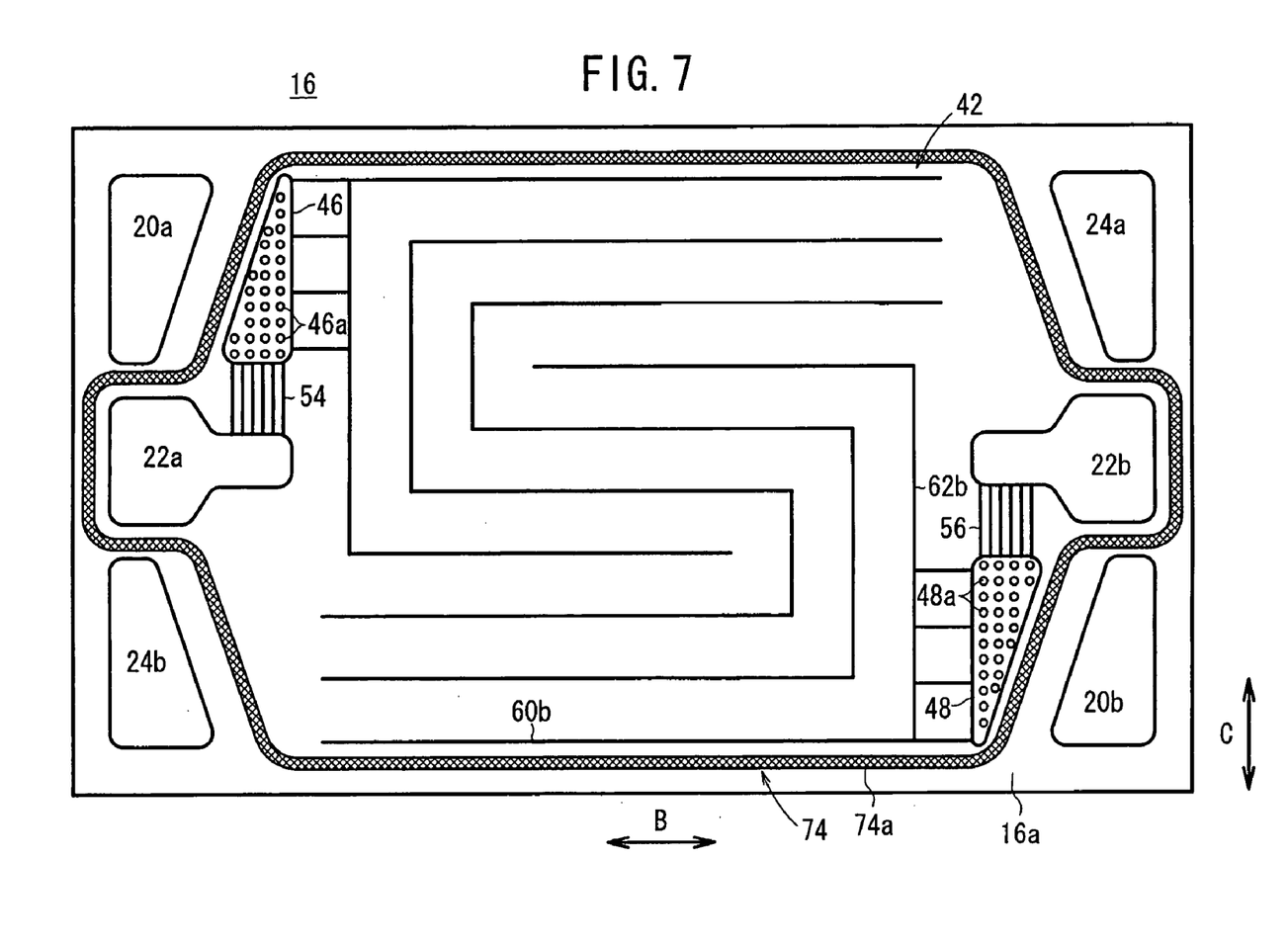
FIG. 7 is a front view showing one surface of a second metal plate.

As shown in FIG. 7, part of the coolant flow field 42 is formed on the surface 16a of the second metal separator 16 in a region where the fuel gas flow field 66 as described later is not formed. Specifically, the second inlet buffer section 46 connected to the coolant supply passage 22a and the first outlet buffer section 48 connected to the coolant discharge passage 22b are formed on the surface 16b.

Further, a plurality of grooves 60b as part of the straight grooves 60 extend in the direction indicated by the arrow B, and a plurality of grooves 62b as part of the straight grooves 62 extend in the direction indicated by the arrow C on the surface 16a.

Figure 8:
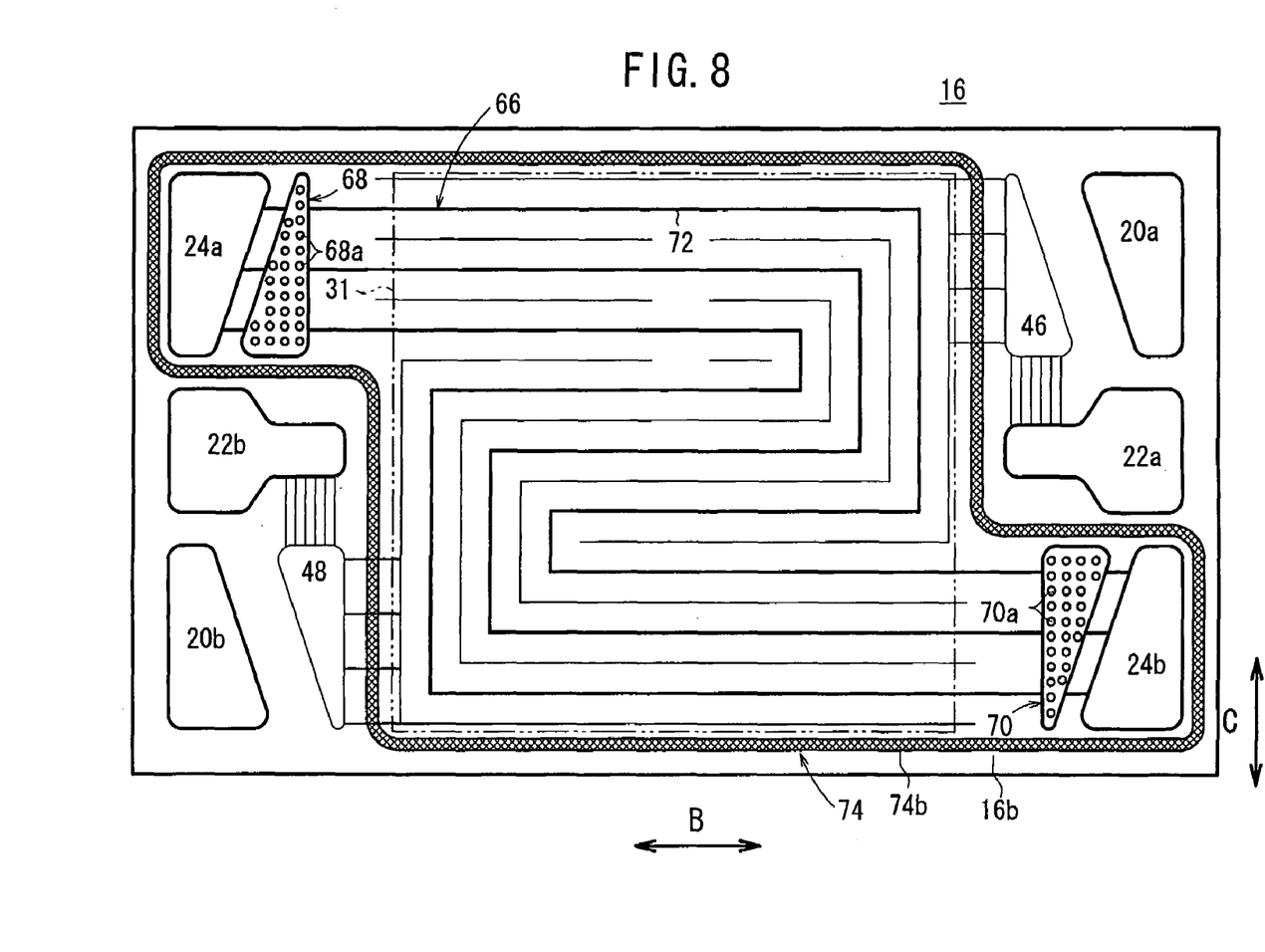
FIG. 8 is a front view showing the other surface of the second metal plate.

As shown in FIG. 8, the second metal plate 16 has a fuel gas flow field 66 on its surface 16b facing the membrane electrode assembly 12. The fuel gas flow field 66 is connected to the fuel gas supply passage 24a at one end, and connected to the fuel gas discharge passage 24b at the other end. In the fuel gas flow field 66, a substantially right triangular (substantially triangular) inlet buffer section 68 is provided near the fuel gas supply passage 24a, and a substantially right triangular (substantially triangular) outlet buffer section 70 is provided near the fuel gas discharge passage 24b.

The shape of the inlet buffer section 68 and the shape of the outlet buffer section 70 are substantially symmetrical with each other. A plurality of bosses 68a are formed in the buffer section 68, and a plurality of bosses 70a are formed in the buffer section 70.

The fuel gas flow field 66 includes a plurality of fuel gas grooves 72 extending in parallel, and connected between the inlet buffer section 68 and the outlet buffer section 70. Each of the fuel gas grooves 72 has a serpentine pattern such that the fuel gas flows through the fuel gas grooves 72 back and forth in the direction indicated by the arrow B, and turns in the direction indicated by the arrow C. The inlet buffer section 68 and the outlet buffer section 70 are provided outside the power generation area 31. The shapes of the extensions 12c, 12d of the membrane electrode assembly 12 correspond to the shapes of the inlet buffer section 68 and the outlet buffer section 70.

The fuel gas flow fields 66 has a serpentine passage having an even number of, e.g., two turn regions in the surface 16b of the second metal plate 16. The width of the extensions 12c, 12d is substantially the same as the width of the turn regions of the serpentine passage.

A second seal member 74 is formed integrally on the surfaces 16a, 16b of the second metal separator 16 to cover (sandwich) the outer edge of the second metal separator 16. The second seal member 74 includes a line seal 74a provided on the surface 16a around the coolant supply passage 22a, the coolant discharge passage 22b, and the coolant flow field 42 for preventing leakage of the coolant as shown in FIG. 7, and a line seal 74b provided on the surface 16b around the fuel gas supply passage 24a, the fuel gas discharge passage 24b, and the fuel gas flow field 66 for preventing leakage of the fuel gas as shown in FIG. 8.

Next, operation of the fuel cell according to the embodiment of the present invention will be described below.

As shown in FIG. 1, an oxygen-containing gas is supplied to the oxygen-containing gas supply passage 20a, and a fuel gas such as a hydrogen-containing gas is supplied to the fuel gas supply passage 24a. Further, a coolant such as pure water, an ethylene glycol or an oil is supplied to the coolant supply passage 22a.

The oxygen-containing gas flows from the oxygen-containing gas supply passage 20a into the oxygen-containing gas flow field 32 of the first metal separator 14. In the oxygen-containing gas flow field 32, as shown in FIG. 4, the oxygen-containing gas flows into the inlet buffer section 34 temporarily. Then, the oxygen-containing gas is distributed from the inlet buffer section 34 into the plurality of oxygen-containing gas grooves 38. The oxygen-containing gas flows through the oxygen-containing gas grooves 38 in a serpentine pattern along the cathode 30 of the membrane electrode assembly 12 for inducing an electrochemical reaction at the cathode 30.

The fuel gas flows from the fuel gas supply passage 24a into the fuel gas flow field 66 of the second metal separator 16. In the fuel gas flow field 66, as shown in FIG. 8, the fuel gas flows into the inlet buffer section 68 temporarily. Then, the fuel gas is distributed from the inlet buffer section 68 into the plurality of fuel gas grooves 72. The fuel gas flows through the fuel gas grooves 72 in a serpentine pattern along the anode 28 of the membrane electrode assembly 12 for inducing an electrochemical reaction at the anode 28.

Thus, in the membrane electrode assembly 12, the oxygen-containing gas supplied to the cathode 30, and the fuel gas supplied to the anode 28 are consumed in the electrochemical reactions at catalyst layers of the cathode 30 and the anode 28 for generating electricity.

After the oxygen in the oxygen-containing gas is consumed at the cathode 30, the oxygen-containing gas is discharged into the oxygen-containing gas discharge passage 20b through the outlet buffer section 36 (see FIG. 1). Likewise, after the fuel gas is consumed at the anode 28, the fuel gas is discharged into the fuel gas discharge passage 24b through the outlet buffer section 70 (see FIG. 8).

The coolant from the coolant supply passage 22a flows into the coolant flow field 42 between the first and second metal separators 14, 16. In the coolant flow field 42, as shown in FIG. 5, the coolant flows into the first and second inlet buffer sections 44, 46 temporarily through the first and second inlet connection channels 52, 54 extending from the coolant supply passage 22a in the direction indicated by the arrow C.

Then, the coolant is distributed from the first and second inlet buffer sections 44, 46 into the plurality of straight grooves 60. The coolant flows through the straight grooves 60 horizontally in the direction indicated by the arrow B. The coolant is partially supplied to the plurality of straight grooves 62, and flows through the straight grooves 62 vertically in the direction indicated by the arrow C. Thus, the coolant is supplied to the entire electrode surface of the membrane electrode assembly 12. After the coolant is used for cooling the power generation surface, the coolant flows into the first and second outlet buffer sections 48, 50 temporarily. Then, the coolant is discharged into the coolant discharge passage 22b through the first and second outlet connection channels 56, 58.

In the embodiment of the present invention, the membrane electrode assembly 12 has a substantially rectangular shape as a whole. The four extensions 12a to 12d extend outwardly from the corners of the membrane electrode assembly 12. The extensions 12a, 12b seal the inlet buffer 34 and the outlet buffer 36 hermetically, and the extensions 12c, 12d seal the inlet buffer section 68 and the outlet buffer section 70 hermetically.

Thus, the extensions 12a to 12d have the sealing function for preventing leakage of the oxygen-containing gas and the fuel gas. With the extensions 12a to 12d, the sealing structure can be simplified easily. The oxygen-containing gas flow field 32 is connected to the inlet buffer section 34 and the outlet buffer section 36. The fuel gas flow field 66 is connected to the inlet buffer section 68 and the outlet buffer section 70. Therefore, the oxygen-containing gas and the fuel gas flow smoothly, flooding can be prevented reliably, and leakage of the oxygen-containing gas and the fuel gas can be prevented desirably.

Since only the extensions 12a to 12d extend outwardly from the power generation area 31, the oxygen-containing gas and the fuel gas can be supplied to the entire surfaces of the substantially rectangular membrane electrode assembly 12. The effective power generation area of the membrane electrode assembly 12 is increased, and thus, the power generation efficiency of the membrane electrode assembly 12 is improved. With the simple structure, it is possible to achieve the desired power generation performance.

The separator 13 includes the first and second metal plates 14, 16. The grooves and protrusions of the first inlet buffer section 44 and the second outlet buffer section 50 for the coolant, in addition to the inlet buffer section 34, and the outlet buffer section 36, are formed on the surface 14a of the first metal plate 14. Likewise, the grooves and protrusions of the second inlet buffer section 46 and the first outlet buffer section 48 for the coolant in addition to the inlet buffer section 68 and the outlet buffer section 70 are formed on the surface 16b of the second metal separator 16. The membrane electrode assembly 12 has four extensions 12a to 12d at the four corners. Thus, the leakage of the oxygen-containing gas and the fuel gas can be prevented efficiently.

Further, the extensions 12a to 12d have the substantially triangular shape corresponding to the shapes of the inlet buffer sections 34, 68, and the outlet buffer sections 36, 70. Thus, the wide area of the membrane electrode assembly 12 can be used for power generation, and thus the membrane electrode assembly 12 can perform the power generation efficiently.

The oxygen-containing gas flow field 32 has a serpentine passage having an even number of, e.g., two turn regions in the surface 14a of the first metal plate 14. The width of the extensions 12a, 12b is substantially same as the width of the turn regions of the serpentine passage. Likewise, the fuel gas flow field 66 has a serpentine passage having an even number of, e.g., two turn regions in the surface 16b of the second metal plate 16. The width of the extensions 12c, 12d is substantially same as the width of the turn regions of the serpentine passage. Thus, the electrode surfaces of the membrane electrode assembly 12 are provided in the regions where the inlet buffer sections 34, 68, and the outlet buffer sections 36, 70 are not provided. Thus, the contact resistance does not increase, and the power generation performance can be improved easily.

In the embodiment of the present invention, the surface area of the anode 28 is smaller than the surface area of the cathode 30. The shape of the membrane electrolyte assembly 12 has rotational symmetry of 180° in a plan view, i.e., the shape of the membrane electrolyte assembly 12 does not change after the membrane electrolyte assembly 12 is rotated by 180°. Therefore, the front surface and the back surface of the membrane electrode assembly 12 can be distinguished easily. In assembling the membrane electrode assembly 12, it is not likely that the front surface of the membrane electrode assembly 12 is mistakenly handled as the back surface of the membrane electrode assembly 12.

The membrane electrode assembly 12 can be used suitably even if it is rotated by 180°. For example, the extensions 12a, 12b can seal the outlet buffer section 36 and the inlet buffer section 34 hermetically, and the extensions 12c, 12d can seal the outlet buffer section 70 and the inlet buffer section 68 hermetically. Accordingly, the fuel cell 10 can be assembled easily and efficiently.

Figure 9:
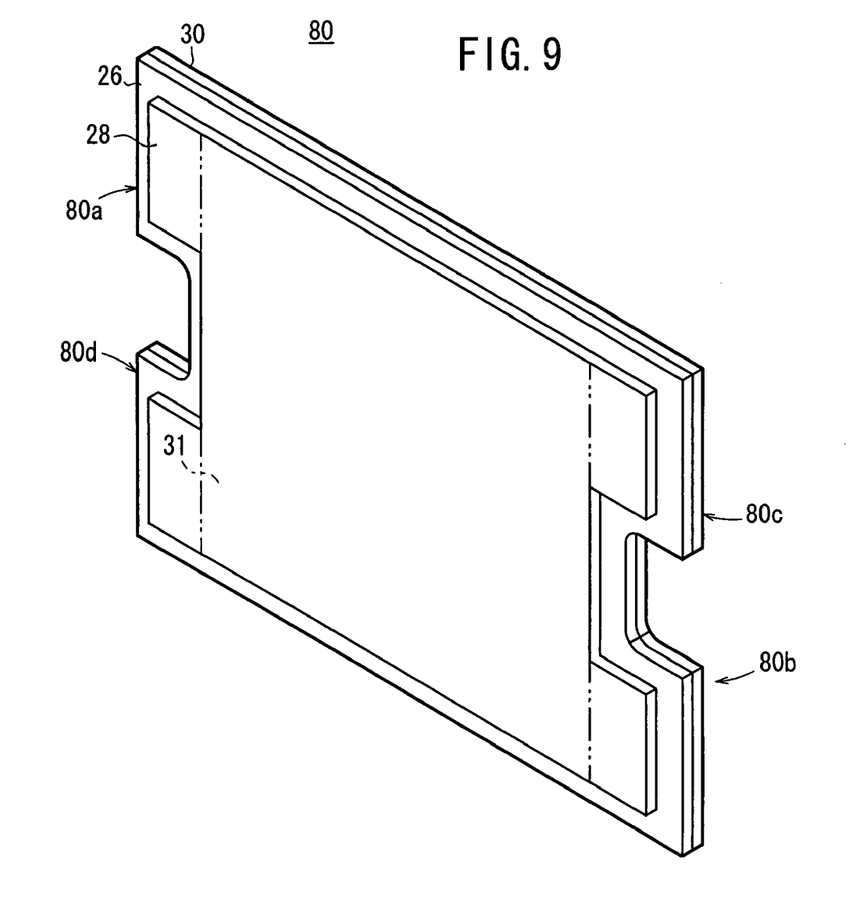
FIG. 9 is a perspective view showing another membrane electrode assembly.

When the inlet buffer section 34, 68 and the outlet buffer sections 36, 70 have a substantially rectangular shape, a membrane electrode assembly 80 shown in FIG. 9 can be used in place of the membrane electrode assembly 12. The membrane electrode assembly 80 has an anode 28, and a cathode 30, and a solid polymer electrolyte membrane 26 interposed between the anode 28 and the cathode 30. The membrane electrode assembly 80 has a substantially rectangular shape as a whole. At least one corner of the membrane electrode assembly 80 has an extension. For example, four corners of the membrane electrode assembly 80 have four extensions 80a to 80d which extend outwardly. The shape of the membrane electrode assembly 80 has rotational symmetry.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A membrane electrode assembly for use in a fuel cell, said membrane electrode assembly comprising:
a first electrode;
a second electrode, wherein a surface area of said first electrode is smaller than a surface area of said second electrode, and said second electrode is provided to cover the entire surface of said membrane electrode assembly; and
a solid polymer electrolyte membrane interposed between said first electrode and said second electrode,
wherein said membrane electrode assembly has a substantially rectangular shape as a whole, and at least one corner of said membrane electrode assembly has an extension which extends outwardly.

2. A membrane electrode assembly according to claim 1, wherein at least two corners at diagonal positions of said membrane electrode assembly have said extension.

3. A membrane electrode assembly according to claim 1, wherein said extension has an inclined end to have a substantially triangle shape.

4. A membrane electrode assembly according to claim 1, wherein said membrane electrode assembly has a rotationally symmetrical shape.

5. A membrane electrode assembly according to claim 1, wherein said extension is provided outside power generation area of said membrane electrode assembly.

6. A fuel cell including a membrane electrode assembly and a pair of separators sandwiching said membrane electrode assembly, said membrane electrode assembly including a first electrode, a second electrode, and an electrolyte membrane interposed between said first electrode and said second electrode,
wherein a reactant gas flow field is formed between said membrane electrode assembly and said separator for supplying a reactant gas along an electrode surface;
at least one buffer section connected to said reactant gas flow field is provided on said separator outside power generation area of said membrane electrode assembly;
said membrane electrode assembly has a substantially rectangular shape as a whole; and
at least one corner of said membrane electrode assembly has an extension protruding toward said buffer section.

7. A fuel cell according to claim 6, wherein at least two corners at diagonal positions of said membrane electrode assembly have said extension.

8. A fuel cell according to claim 6, wherein said extension has an inclined end to have a substantially triangle shape.

9. A fuel cell according to claim 6, wherein surface area of said first electrode is smaller than surface area of said second electrode, and said second electrode is provided to cover the entire surface of said membrane electrode assembly.

10. A fuel cell according to claim 6, wherein said reactant gas flow field has a serpentine passage having an even number of turn regions in a surface of said separator, and the width of said extension is substantially the same as the width of said turn regions of said serpentine passage.

11. A fuel cell according to claim 6, wherein said membrane electrode assembly has a rotationally symmetrical shape.

12. A fuel cell according to claim 6, wherein said separator is made of a metal plate.

* * * * *